(12) United States Patent
Burke et al.

(10) Patent No.: US 8,359,746 B2
(45) Date of Patent: Jan. 29, 2013

(54) DEAERATOR SPRAY NOZZLE AND RELATED METHODS

(75) Inventors: Russell G. Burke, Quakertown, PA (US); Tao D. Nguyen, King of Prussia, PA (US); Joseph T. Strogus, Trooper, PA (US)

(73) Assignee: Crane Environmental, Inc., Trooper, PA (US)

( * ) Notice: Subject to any disclaimer, the term of this patent is extended or adjusted under 35 U.S.C. 154(b) by 0 days.

(21) Appl. No.: 13/333,041

(22) Filed: Dec. 21, 2011

(65) Prior Publication Data

US 2012/0084982 A1 Apr. 12, 2012

Related U.S. Application Data

(62) Division of application No. 12/400,190, filed on Mar. 9, 2009, now Pat. No. 8,114,202.

(51) Int. Cl.
*B01D 19/00* (2006.01)
*B21D 51/24* (2006.01)

(52) U.S. Cl. ........... 29/890.051; 29/890.09; 29/890.143; 95/244; 95/264; 96/203; 96/243

(58) Field of Classification Search ............. 29/890.051, 29/890.09, 890.143; 95/244, 264; 96/203, 96/243

See application file for complete search history.

(56) References Cited

U.S. PATENT DOCUMENTS

| | | |
|---|---|---|
| 2,097,158 A | 10/1939 | Joos |
| 2,344,554 A | 3/1944 | McDermet |
| 2,689,018 A | 9/1954 | Kittredge |
| 2,956,752 A | 10/1960 | Wahlin |
| 3,346,188 A | 10/1967 | Nusbaum |
| 4,147,280 A | 4/1979 | Spatz |
| 4,161,288 A | 7/1979 | McKinney |
| 4,271,909 A | 6/1981 | Chatfield et al. |
| 4,437,611 A | 3/1984 | Gilroy |
| 4,698,076 A | 10/1987 | Bekedam |
| 4,699,320 A | 10/1987 | Sisson et al. |
| 4,938,193 A | 7/1990 | Raufelsen et al. |
| 5,598,950 A | 2/1997 | Liu et al. |
| 5,875,976 A | 3/1999 | Nelson et al. |
| 6,196,477 B1 | 3/2001 | Halltorp et al. |
| 6,880,768 B2 | 4/2005 | Lau |
| 6,946,472 B2 | 9/2005 | Kawasaki et al. |
| 7,124,744 B2 | 10/2006 | Weimken et al. |
| 7,328,819 B2 | 2/2008 | Lewis |
| 7,458,485 B2 | 12/2008 | Amron |
| 7,472,842 B2 | 1/2009 | Gilpatrick et al. |
| 8,114,202 B2 | 2/2012 | Burke et al. |
| 2003/0042336 A1 | 3/2003 | Wuttke et al. |
| 2005/0023372 A1 | 2/2005 | Weimken et al. |
| 2005/0023379 A1 | 2/2005 | Lau |
| 2006/0261087 A1 | 11/2006 | Amron |
| 2009/0229465 A1 | 9/2009 | Takahashi |
| 2009/0293729 A1* | 12/2009 | Behruzi et al. ................ 96/181 |
| 2010/0300296 A1* | 12/2010 | Venturelli ....................... 96/203 |

* cited by examiner

*Primary Examiner* — Alexander P Taousakis
(74) *Attorney, Agent, or Firm* — Woodcock Washburn LLP

(57) ABSTRACT

A spray nozzle assembly and hub combination for operation in a boiler feedwater deaerator is disclosed, the combination including a tubular hub capable of being affixed to a wall of a deaerator tank and a spray nozzle assembly that is removably engageable with the hub, the nozzle assembly including a nozzle body, a twist lock for retaining the nozzle body relative to the hub when the nozzle body is in a fully engaged position, and a spreader moveably coupled to the nozzle body and biased by a spreader spring against opening, the spreader is capable of moving to an open position against the spreader spring bias in response to boiler feedwater pressure to form an annular opening about the spreader, thereby enabling feedwater flow.

5 Claims, 1 Drawing Sheet

DEAERATOR SPRAY NOZZLE AND RELATED METHODS

CROSS REFERENCE TO RELATED APPLICATION

This application is a divisional application of pending U.S. patent application Ser. No. U.S. 12/400,190, filed on Mar. 9, 2009. The foregoing application is incorporated by reference herein in its entirety.

TECHNICAL FIELD

The present invention relates to treatment of boiler feedwater, and more particularly to assemblies and related methods for boiler feedwater deaerators.

BACKGROUND

Deaerators remove oxygen and other entrained gases from the feedwater systems of boilers. In many commercial deaerators, feedwater is sprayed from the top of a tank, often onto horizontal trays, and steam enters the tank via a sparger. Feedwater, stripped of gases and preheated by the steam, exits near the bottom of the tank.

Typical feedwater spray nozzles include a cast or fabricated body and a conical or parabolic shaped spreader. The spreader is located within a collar on the body and biased to a closed position by a spring. Feedwater pressure moves the spreader against the bias of the spring to create an annular opening between the spreader and the collar.

Typically, deaerator spray nozzles include flanges for bolting the body to the inside of the deaerator tank or are threaded into a coupling or similar mounting component. There is a general need for improved deaerator spray nozzles that are more easily installed within a deaerator.

SUMMARY

A spray nozzle assembly and hub combination for operation in a boiler feedwater deaerator includes a tubular hub capable of being affixed to a wall of a deaerator tank and a spray nozzle assembly that is removably engageable with the hub. The nozzle assembly includes a nozzle body, a twist lock for retaining the nozzle body relative to the hub when the nozzle body is in a fully engaged position, and a spreader moveably coupled to the nozzle body and biased by a spreader spring against opening. The spreader is capable of moving to an open position against the spreader spring bias in response to boiler feedwater pressure to form an annular opening about the spreader, thereby enabling feedwater flow.

The spray nozzle assembly and hub combination may include a longitudinal shaft that is coupled to the nozzle body and a retainer that is coupled to the shaft, wherein the spreader spring is in tension between the retainer and the spreader to provide the spreader spring bias. The spreader may contact a rim of the nozzle body when the spreader is in a closed position. The twist lock may be actuateable at least in part by twisting of the nozzle body relative to the hub. The twist lock may include a lock spring that biases against insertion of the nozzle body into the hub. The combination may include a handle that extends past an outlet end of the nozzle assembly such that the nozzle assembly is insertable into the hub by actuation of the handle. The twist lock may include pins extending from the nozzle body and corresponding J-shaped slots in the hub such that the nozzle assembly is engageable with the hub upon (i) insertion of the pins into open ends of the J-shaped slots against a lock spring bias and (ii) twisting of the nozzle assembly by means of the handle to move the pins to short legs of the J-shaped slots. The combination may include a lock spring in compression between the nozzle body and a retaining surface on the hub while the nozzle assembly is in a fully engaged, operational position in which the pins are biased against the ends of the short legs of the J-shaped slots. The nozzle assembly may be engageable with the hub without tools. The combination may include an O-ring between the body and the hub. The body may include a circumferential groove in which at least a part of the O-ring is retained.

A method of installing a spray nozzle assembly into a boiler feedwater deaerator includes the steps of: accessing an interior of a deaerator tank, providing a spray nozzle assembly that includes a lock feature, a nozzle body, and a spreader that is biased toward a closed position and openable in response to boiler feedwater pressure at a deaerator inlet, inserting at least a portion of the spray nozzle assembly into a hub affixed to the deaerator against bias of a spring, and twisting the spray nozzle assembly relative to the hub to engage the lock feature to secure the spray nozzle assembly relative to the hub.

The lock feature provided in the method of installing a spray nozzle assembly into a boiler feedwater deaerator may be a pin that extends from the nozzle body that engages with a corresponding groove in the hub. The groove provided in the method may be an inverted J-shape such that when the spray nozzle assembly is in an installed position at the completion of the twisting step, the spring biases the pin against an end of a short leg of the J-shaped groove. The inserting step and the twisting step in the method may be performed by an installer's one hand without tools. The accessing step may consist of an installer accessing the tank interior by reaching through an access port without the installer's trunk entering into the tank interior.

A spray nozzle for insertion into a hub that is affixed to a wall of a feedwater deaerator tank includes a nozzle body, a twist lock for retaining the nozzle body relative to the hub when the nozzle body is in a fully engaged position, and a spreader moveably coupled to the nozzle body and biased by a spreader spring against opening. The spreader is capable of moving to an open position against the spreader spring bias in response to boiler feedwater pressure to form an annular opening about the spreader, thereby enabling feedwater flow.

These and various other advantages and features are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred embodiments of the invention.

DETAILED DESCRIPTION OF ILLUSTRATIVE EMBODIMENTS

Figure 1:
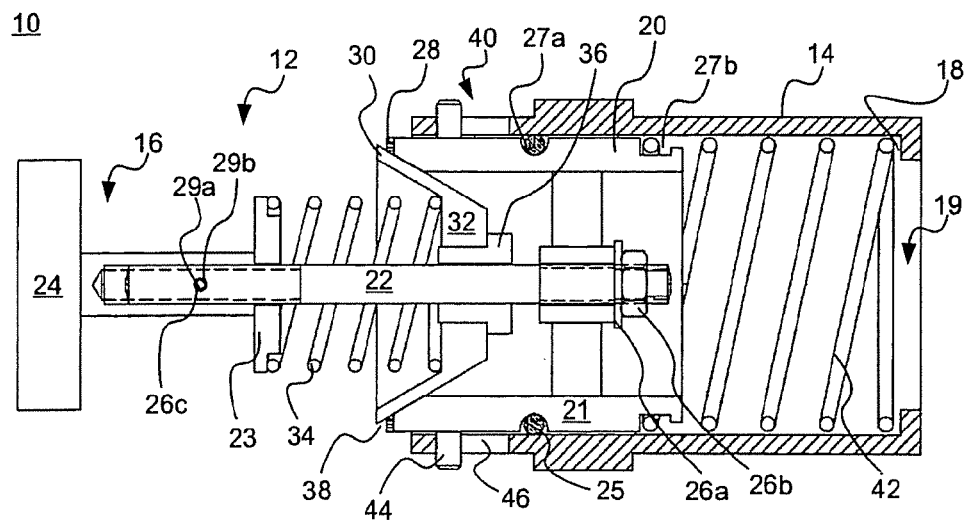
FIG. 1 is a side cross-sectional view of a spray nozzle assembly and hub combination for operation in a boiler feedwater deaerator.

Referring to FIG. 1 to illustrate a preferred structure and function of the present invention, a spray nozzle assembly and hub combination 10 for operation in a boiler feedwater deaerator includes a spray nozzle assembly 12 and a hub 14. The spray nozzle assembly 12 has an outlet end 16, an inlet end 19, and includes a body assembly 20, a spreader assembly 30, and a twist lock assembly 40. The hub 14 has a retaining surface 18. The body assembly 20 includes a body 21, a longitudinal shaft 22, a spreader spring retainer 23, a handle 24, an O-ring 25, a locknut 26a, a washer 26b, and a cotter pin 26c. The body 21 defines a circumferential O-ring groove 27a and a circumferential spring groove 27b and has a rim (or collar) 28. The longitudinal shaft 22 defines a cotter pin opening 29a, and the handle 24 defines cotter pin holes 29b. The spreader assembly 30 includes a spreader 32, a spreader spring 34, and a spreader bushing 36. The spreader 32 and the rim 28 of the body 21 define an annular opening 38 when the spreader 32 is disposed in an open position. When the spreader 32 is disposed in a closed position, the spreader may be seated against the rim 28 of the body 21. The twist lock assembly 40 includes a lock spring 42, pins 44, and slots (or grooves) 46. Each slot 46 defines a open end 47 (shown in FIG. 2) and a short leg 48 (shown in FIG. 2). The short leg 48 of each slot 46 has an end 49 (shown in FIG. 2).

The spray nozzle assembly 12 may be used to spray feedwater into a boiler feedwater deaerator (not shown), via the annular opening 38 between the spreader 32 and the rim 28 of the body 21. The hub 14 is a hub that may be used for attachment of the spray nozzle assembly 12 to a boiler feedwater deaerator. The spray nozzle assembly 12 may be releaseably coupled to the hub 14 via the twist lock assembly 40.

The body 21 may serve as a set of surfaces (including, for example, the rim 28) relative to which the spreader assembly 30 may move to spray feedwater into the boiler feedwater deaerator (not shown). In the embodiment shown in FIG. 1, the body 21 has a rim (or collar) 28, which may be used as the primary surface against which the spreader 32 rests when disposed in a closed position. When the spreader 32 is disposed in an open position, the rim 28 may also be used to help direct the flow of feedwater out of the spray nozzle assembly 12 and into the boiler feedwater deaerator (not shown). At least part of the rim 28 may have a corrugated shape, which may help direct the flow of feedwater out of the spray nozzle assembly 12 in a radially outward direction from the rim 28, in a pattern (not shown) of at least partially discrete jets, a thin film, a sheet, droplets, or any other pattern that is known in the art. The rim 28 may have any number of corrugations, including 12, 20, 50, or even 100 corrugations. In some embodiments (not shown), the rim 28 may have a flat shape (not corrugated), or any other shape that allows feedwater to flow out of the spray nozzle assembly 12. The particular shape of the rim 28 and number of corrugations will depend on performance and design considerations of the spray nozzle assembly and hub combination 10.

Figure 2:
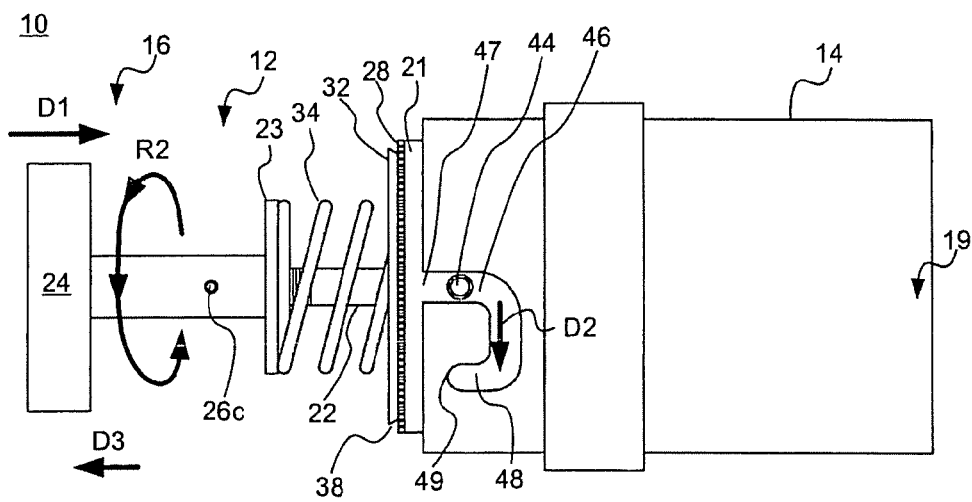
FIG. 2 is a side view of a spray nozzle assembly and hub combination for operation in a boiler feedwater deaerator.

In the embodiment shown in FIGS. 1 and 2, the body 21 may be approximately cylindrical in shape. However, in other embodiments (not shown), the body 21 may have other shapes, such as square, hexagonal, or any other shape that allows the body 21 to serve the function of providing a rim 28 against which the spreader assembly 30 may move, as well as allowing the twist lock assembly 40 to retain the spray nozzle assembly 12 in the hub 14.

In the embodiment shown in FIG. 1, the body 21 includes an O-ring 25, which is positioned or seated in the circumferential O-ring groove 27a. The O-ring 25 may provide a water-resistant and pressure-resistant seal between the spray nozzle assembly 12 and the hub 14. The O-ring 25 may be made from rubber or any other suitable material for water and pressure sealing that is known in the art.

In FIG. 1, the O-ring 25 is coupled to the body 21 in the circumferential O-ring groove 27a and one end of the lock spring 42 is coupled to the body 21 in the circumferential spring groove 27b. However, in other embodiments (not shown), the O-ring 25 and one end of the lock spring 42 may both occupy a single circumferential groove. In other embodiments (not shown), the O-ring 25 may be replaced by a sealing mechanism of another type or having another shape. For example, in one embodiment, there may be multiple O-rings 25 positioned in multiple respective circumferential O-ring grooves 27a. In another embodiment, the outer surface of body 21 may be coated with a sheet of rubber or another flexible material that is capable of creating a water-resistant and pressure-resistant seal between the body 21 and the hub 14, or the outer surface of body 21 may have circumferential ribs made of rubber or another flexible material that is capable of creating a water-resistant and pressure-resistant seal between the body 21 and the hub 14.

In the embodiment shown in FIG. 1, the longitudinal shaft 22 is attached to the body 21 via the locknut 26a and the washer 26b. The longitudinal shaft 22 may be threaded so that the locknut 26a may be screwed onto the longitudinal shaft 22. In other embodiments, any other suitable mechanism known in the art may be used to removably or permanently attach the longitudinal shaft 22 to the body 21, including welding, screws, and a cotter pin.

The spreader spring retainer 23 may be attached to the handle 24 via any suitable mechanism known in the art that may be used to removably or permanently attach the spreader spring retainer 23 to the handle 24, including welding, bolting, and screws. In some embodiments (not shown), the spreader spring retainer 23 may be formed in a continuous piece with the handle 24 (e.g., a single casting). In the embodiment shown in FIG. 1, the spreader spring retainer 23 may remain fixed relative to body 21, which may increase the potential energy in the spreader spring 34 when the spreader 32 is disposed in an open position (closer to the spreader spring retainer 23), relative to the lower potential energy in the spreader spring 34 when the spreader 32 is disposed in a closed position.

The handle 24 may be attached to the body 21 via the longitudinal shaft 22. In the embodiment shown in FIG. 1, the handle 24 is attached to the longitudinal shaft 22 using the cotter pin 26c, which is preferably press-fitted through two cotter pin holes 29b in the handle 24 and the cotter pin opening 29a in the longitudinal shaft 22. In other embodiments, any other suitable mechanism known in the art may be used to removably or permanently attach the handle 24 to the longitudinal shaft 22, including welding, bolting, and screws. The handle 24 may be of an appropriate size and thickness to allow a human operator to effectively grasp the handle 24 so that the handle 24 may be used to twist the spray nozzle assembly 12 onto the hub 14.

Although in the embodiment shown in FIG. 1, the handle 24, spreader spring retainer 23, longitudinal shaft 22 and body 21 are separate components, in other embodiments (not shown), two or more of the handle 24, spreader spring retainer 23, longitudinal shaft 22, and body 21 may be made of a single-piece construction (e.g., a single casting).

In the embodiment shown in FIG. 1, the spreader assembly 30 may allow the spreader 32 to actuate between being disposed in a closed position, disposed against the rim 28, and being disposed in an open position, spaced apart from the rim 28 and defining an annular opening 38.

As can be seen in FIG. 1, the spreader 32 may be attached to a spreader bushing 36 that allows the spreader 32 to slide along the longitudinal shaft 22 in an axial direction. The spreader bushing 36 may be made from plastic, Teflon, a metal such as steel or aluminum, or any other suitable material for water and pressure sealing that is known in the art, while allowing the spreader bushing 36 to smoothly slide back and forth, preferably without lubricant, along the longitudinal shaft 22. The spreader bushing 36 may be attached to the spreader 32 via any suitable mechanism known in the art that may be used to removably or permanently attach the spreader bushing 36 to the spreader 32, including a press-fit, welding, bolting, and screws. In some embodiments (not shown), the spreader bushing 36 may be formed in a continuous piece with the spreader 32 (e.g., a single casting).

In the embodiment shown in FIG. 1, the spreader spring 34 is positioned between the spreader spring retainer 23 and the spreader 32. As can be seen in FIG. 1, a first end of the spreader spring 34 may be disposed against the spreader spring retainer 23, and a second end of the spreader spring 34 may be disposed against the spreader 32. The spreader spring 34 is positioned such that when the spreader 32 slides along the longitudinal shaft 22 towards the spreader spring retainer 23 (which may be in an axially-fixed position relative to the spreader 32), the potential energy in the spreader spring 34 is increased (and thereby the force acting on the spreader spring retainer 23 and the spreader 32 is increased). When the spreader 32 moves away from the rim 28 of the body 21 and creates the annular opening 38, the spreader spring 34 may be biased towards pushing the spreader 32 back towards the rim 28 of the body 21 (i.e., the spreader 32 may be biased toward a closed position and openable in response to boiler feedwater pressure at a deaerator inlet 19). Therefore, in this embodiment, when the pressure from the feedwater increases, the spreader 32 may be forced towards the spreader spring retainer 23, such that the spreader 32 is disposed in an open position, and when the pressure from the feedwater decreases, the spreader spring 34 may force the spreader 32 back towards the rim 28 of the body 21, such that the spreader 32 is disposed in a closed position.

Although in FIG. 1, the spreader spring 34 is depicted as a coil spring, in other embodiments, the spreader spring 34 may be replaced by any spring mechanism or other mechanism that is capable of biasing the spreader 32 to be disposed in a closed position against the rim 28 of the body 21 when the feedwater pressure is below a desired threshold level, while being capable of allowing the spreader 32 to be disposed in an open position, spaced apart form the rim 28 of the body 21 to define an annular opening 38, when the feedwater pressure exceeds a desired threshold level.

The annular opening 38 that is defined by the space between the spreader 32 and the rim 28 of the body 21, when the spreader 32 is disposed in an open position, may be of any diameter, height, and cross-sectional area that is sufficient to allow the desired throughput of feedwater to pass through the annular opening 38. The maximum surface area that is defined by the annular opening 38 will depend on the desired feedwater throughput speed and performance characteristics of the spray nozzle assembly and hub combination 10.

In the embodiment shown in FIGS. 1 and 2, the twist lock assembly 40 may allow the spray nozzle assembly 12 to twist onto the hub 14. When the body 21 of the spray nozzle assembly 12 is in a fully engaged position in the hub 14, the body 21 may be retained relative to the hub 14, and the spray nozzle assembly 12 may be secured relative to the hub 14. Referring to FIG. 1, the twist lock assembly 40 includes a lock spring 42, pins 44, and slots (or grooves) 46. Referring to FIG. 2, each slot 46 defines a open end 47 and a short leg 48. The short leg 48 of each slot 46 has an end 49.

In the embodiment shown in FIGS. 1 and 2, the twist lock assembly 40 is preferably actuated by the performance of a three-step actuation process. During the first insertion step, a user (not shown) places a hand on the handle 24 and applies a force approximately in a direction D1 that moves the spray nozzle assembly 12 in a direction D1 towards the hub 14, making sure to align the pins 44 with the open ends 47 of the respective slots 46. As the spray nozzle assembly 12 continues to move in the direction D1, the pins 44 enter the slots 46 via the respective open ends 47. During the first insertion step, the lock spring 42 is compressed, and the potential energy of the lock spring 42 increases as the spray nozzle assembly 12 continues to move in the direction D1 (i.e., the lock spring 42 is biased against insertion of the body 21 of the spray nozzle assembly 12 into the hub 14).

During the second twist step, the user preferably twists the handle 24 in a rotational direction R2 (which may be clockwise or counterclockwise), which moves the pins 44 through the corresponding slots 46 in a corresponding direction D2. During the third engagement step, the user preferably reduces the force that was applied in the direction D1, thereby allowing the lock spring 42 to push the body 21 in a direction D3, causing the pins 44 to slide along the corresponding short legs 48 until the pins 44 come to rest against the corresponding ends 49. When the pins 44 reach the corresponding ends 49, the body 21 of the spray nozzle assembly 12 is in a fully engaged position in the hub 14. While the body 21 is in the fully engaged position in the hub 14, the lock spring 42 continues to exert a force against the body 21 in the direction D3, which allows the body 21 to be retained in position with the pins 44 against the corresponding ends 49, such that the spray nozzle assembly and hub combination 10 may be operated as intended in a boiler feedwater deaerator (not shown).

In order to remove the spray nozzle assembly 12 from the hub 14, the twist lock assembly 40 is preferably actuated by the performance of a three-step removal process, during which the pins 44 are moved in the reverse directions from that of the actuation process. During the first disengagement step, the user preferably places a hand on the handle 24 and applies a force approximately in a direction opposite that of the direction D3 that moves the spray nozzle assembly 12 in the direction opposite that of the direction D3, thereby increasing the potential energy of the lock spring 42. During the second untwist step, the user preferably twists the handle 24 in a rotational direction opposite the rotational direction R2, which moves the pins 44 through the corresponding slots 46 in a corresponding direction opposite the direction D2. During the third withdrawal step, the user preferably reduces the force that was applied in the direction opposite the direction D3, thereby allowing the lock spring 42 to push the body 21 in a direction opposite the direction D1, causing the pins 44 to slide along the slots 46 until the pins 44 exit the respective slots 46 via the respective open ends 47 and causing the body 21 to exit the hub 14, thereby completing the removal of the spray nozzle assembly 12 from the hub 14.

In some embodiments (not shown), a method of installing a spray nozzle assembly 12 into a boiler feedwater deaerator (not shown) may include the step of accessing the interior of a deaerator tank (not shown), in which a user or an installer (not shown) may access the tank interior by reaching through an access port (not shown), preferably without the installer's trunk entering into the tank interior. In some embodiments, some or all of the steps in the actuation process or the removal process (e.g., the insertion step and the twist step) may be performed by an installer's one hand without tools.

In the embodiment shown in FIG. 1, the lock spring 42 is positioned between the body 21 and the retaining surface 18 of the hub 14. As can be seen in FIG. 1, a first end of the lock spring 42 may be disposed in the circumferential spring groove 27b, and a second end of the lock spring 42 may be disposed against the retaining surface 18 of the hub 14. The lock spring 42 is positioned such that when the body 21 slides in a direction D1 inside the hub 14 towards the retaining surface 18, the potential energy in the lock spring 42 is increased (and thereby the force acting on the body 21 and the retaining surface 18 is increased). The lock spring 42 may be biased towards pushing the body 21 away from the retaining surface 18 of the hub 14, such that the bias of the lock spring 42 may assist the body 21 to be retained in a fully engaged position in the hub 14.

Although in FIG. 1, the lock spring 42 is depicted as a coil spring, in other embodiments, the lock spring 42 may be replaced by any spring mechanism or other mechanism that is capable of biasing the body 21 to be retained in a fully engaged position in the hub 14, while being capable of allowing a typical user to overcome the bias force of the lock spring 42 during the actuation process and removal process.

The pins 44 and corresponding slots 46 of the twist lock assembly 40 may provide a mechanism to control the motion of the body 21 of the spray nozzle assembly 12 during actuation and removal of the body 21 into the hub 14. In the embodiment shown in FIG. 1, the length of each pin 44 is greater than the thickness of the sidewalls of the hub 14. However, in other embodiments (not shown), the length of each pin 44 may be equal to or less than the thickness of the sidewalls of the hub 14. The exact length of each pin 44 may be determined based on the desired ease of alignment of the pins 44 with the respective slots 46, the desired strength of the pins 44, the particular design of the shape of the slots 46, or other design or performance factors of the spray nozzle assembly and hub combination 10.

As can be seen in FIG. 2, the diameter of each pin 44 is sized to be approximately the same size or smaller than the width of the corresponding slots 46. In the embodiment shown in FIG. 2, the cross-sectional profile of each pin 44 is generally circular. However, in other embodiments (not shown), the cross-sectional profile of each pin 44 may be ovoid, square, rectangular, hexagonal, semi-circular, or any other shape the imparts the desired strength to the pin 44 and imparts the desired type and ease of alignment of each pin 44 into the corresponding slot 46. In the embodiment shown, each pin 44 has the same cross-sectional shape, but in other embodiments (not shown), each individual pin 44 may have a shape that is different than the other pins 44 in a particular body 21.

In the embodiment shown in FIG. 1, there are two pins 44, each corresponding to a slot 46. However, in other embodiments (not shown), there may be any number of pins 44, including three, four, five, six, eight, ten, twelve, or any other number that imparts the desired ease of alignment of the pins 44 with the respective slots 46, the desired strength of the pins 44, the particular design of the shape of the slots 46, or other design or performance factors of the spray nozzle assembly and hub combination 10.

In the embodiment shown in FIG. 1, the pins 44 are symmetrically oriented about the cylindrical outer surface of the body 21. However, in other embodiments (not shown), the pins 44 may be asymmetrically oriented about the outer surface of the body 21. In some embodiments, the asymmetry may allow extra space between the pins 44 for some other protrusion or feature in the outer surface of the body 21 or in the inner surface of the hub 14.

As can be seen in FIG. 1, each slot 46 may penetrate completely through the outer wall of the hub 14. However, in other embodiments (not shown), each slot 46 may be a groove in the inside surface of the outer wall of the hub 14 rather than a slot going completely through the outer wall of the hub 14. In other embodiments (not shown), each groove 46 may penetrate to any depth through the outer wall of the hub 14. The particular depth of each groove 46 may depend on the desired strength of the pins 44, the particular design of the shape of the slots 46, or other design or performance factors of the spray nozzle assembly and hub combination 10.

As can be seen in FIG. 2, each slot 46 may be a J-shaped slot (i.e., shaped either like a letter J or a backwards letter J) that may penetrate completely through the outer wall of the hub 14. However, in other embodiments (not shown), each slot 46 may have other shapes, including a T-shape, which may allow each slot 46 to have two short legs 48 and two corresponding ends 49, thereby allowing the twist lock assembly 40 to be actuated by the performance of a three-step actuation process that includes a second twist step of the handle 24 in either a rotational direction R2 or the reverse of the rotational direction R2 (clockwise or counterclockwise), depending on the preference of the user or other design or performance considerations of the spray nozzle assembly and hub combination 10. In other embodiments (not shown), each slot 46 may take any shape that allows the twist lock assembly 40 to be actuated by compression of a lock spring 42 or other equivalent tensioning component, twisting of the body 21, and engagement of the pins 44 against respective ends 49 or other equivalent structures.

As can be seen in FIG. 2, each slot 46 comprises three straight legs, each successive leg oriented at approximately 90 degrees to the previous leg. In other embodiments (not shown), there may be two legs in a V-shape, four or more legs in a W-shape, three or more legs with each leg oriented at 30 degrees, 45 degrees, 60 degrees, or any other angle to the previous leg, or any number of legs in any shape that allows the twist lock assembly 40 to be actuated by compression of a lock spring 42 or other equivalent tensioning component, twisting of the body 21, and engagement of the pins 44 against respective ends 49 or other equivalent structures.

As can be seen in FIG. 2, each slot 46 may span 15 to 45 degrees of the total circumference of the outer wall of the hub 14. However, in other embodiments (not shown), each slot 46 may span any portion of the total circumference of the outer wall of the hub 14, including five degrees, 30 degrees, 60 degrees, 90 degrees, 120 degrees, and 150 degrees, or any other circumferential span that allows the twist lock assembly 40 to be actuated by compression of a lock spring 42 or other equivalent tensioning component, twisting of the body 21, and engagement of the pins 44 against respective ends 49 or other equivalent structures.

In the embodiment shown in FIGS. 1 and 2, the length of the spray nozzle assembly and hub combination 10 in the direction D1 is approximately 9 inches, the length of the body 21 in the direction D1 is approximately 3 inches, the length of the hub 14 in the direction D1 is approximately 5 inches, and the body 21 protrudes out of the hub 14 by approximately 0.25 inches in the direction D1 when the body 21 is in the fully engaged position in the hub 14. However, in other embodiments (not shown), the components of the spray nozzle assembly and hub combination 10 may be any absolute size or any size relative to each other, depending on the design or performance requirements of the spray nozzle assembly and hub combination 10.

All of the components of the spray nozzle assembly and hub combination 10, except for the O-ring 25 and the spreader bushing 36, are preferably made from steel, aluminum, or any other material known in the art having enough strength and durability for use in a boiler feedwater deaerator application. The O-ring 25 may be made from rubber or any other suitable material for water and pressure sealing that is known in the art. The spreader bushing 36 may be made from plastic, Teflon, a metal such as steel or aluminum, or any other suitable material for water and pressure sealing that is known in the art. The various components of the spray nozzle assembly and hub combination 10 may also be coated with any material suitable for protection from oxidation or other corrosion that may occur in such a boiler feedwater deaerator environment, such as zinc or any other suitable material known in the art.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in the relevant art, having the benefit of the teachings of this specification, may effect numerous modifications to the invention as described herein, and changes may be made without departing from the scope and spirit of the invention as defined by the appended claims.

What is claimed:

1. A method of installing a spray nozzle assembly into a boiler feedwater deaerator comprising the steps of:
    accessing an interior of a deaerator tank;
    providing a spray nozzle assembly that includes a lock feature, a nozzle body, and a spreader that is biased toward a closed position and openable in response to boiler feedwater pressure at a deaerator inlet;
    inserting at least a portion of the spray nozzle assembly into a hub affixed to the deaerator against bias of a spring; and
    twisting the spray nozzle assembly relative to the hub to engage the lock feature to secure the spray nozzle assembly relative to the hub.

2. The method of claim 1 wherein the lock feature is a pin that extends from the nozzle body that engages with a corresponding groove in the hub.

3. The method of claim 2 wherein the groove is an inverted J-shape such that when the spray nozzle assembly is in an installed position at the completion of the twisting step, the spring biases the pin against an end of a short leg of the J-shaped groove.

4. The method of claim 1 wherein the inserting step and the twisting step may be performed by an installer's one hand without tools.

5. The method of claim 1 wherein the accessing step consists of an installer accessing the tank interior by reaching through an access port without the installer's trunk entering into the tank interior.

\* \* \* \* \*